United States Patent [19]

Matsumura et al.

[11] Patent Number: 4,931,512

[45] Date of Patent: Jun. 5, 1990

[54] PROCESS FOR PRODUCING A THERMOSET RESIN

[75] Inventors: Shunichi Matsumura; Hiroo Inata; Hiroyuki Umetani; Masuhiro Okada, all of Iwakuni, Japan

[73] Assignee: Teijin Limited, Osaka, Japan

[21] Appl. No.: 235,523

[22] Filed: Aug. 24, 1988

Related U.S. Application Data

[63] Continuation-in-part of Ser. No. 137,950, Dec. 28, 1987, abandoned.

[30] Foreign Application Priority Data

| Dec. 26, 1986 | [JP] | Japan | 61-308515 |
|---|---|---|---|
| Jan. 23, 1987 | [JP] | Japan | 62-12488 |
| Mar. 27, 1987 | [JP] | Japan | 62-71861 |
| May 14, 1987 | [JP] | Japan | 62-115920 |
| Jul. 27, 1987 | [JP] | Japan | 62-185544 |
| Aug. 3, 1987 | [JP] | Japan | 62-192556 |
| Oct. 8, 1987 | [JP] | Japan | 62-252453 |
| Oct. 9, 1987 | [JP] | Japan | 62-253767 |
| Oct. 22, 1987 | [JP] | Japan | 62-265343 |

[51] Int. Cl.$^5$ ............................................. C08L 75/04
[52] U.S. Cl. ............................. 525/333.3; 525/333.7; 525/417; 525/420; 525/450; 525/453; 525/535; 525/540; 528/405
[58] Field of Search .................. 525/333.3, 333.7, 417, 525/420, 450, 453, 535, 540; 528/405

[56] References Cited

U.S. PATENT DOCUMENTS

| 4,430,491 | 2/1984 | Culbertson et al. | 528/212 |
|---|---|---|---|
| 4,474,942 | 10/1984 | Sano et al. | 528/288 |
| 4,600,766 | 7/1986 | Arita et al. | 528/207 |
| 4,613,662 | 9/1986 | Goel | 528/137 |
| 4,640,969 | 2/1987 | Goel et al. | 528/73 |

FOREIGN PATENT DOCUMENTS

| 0266708 | 5/1988 | European Pat. Off. |
| 62-104838 | 5/1987 | Japan. |

*Primary Examiner*—Maurice J. Welsh
*Attorney, Agent, or Firm*—Sherman & Shalloway

[57] ABSTRACT

A process for producing a thermoset resin, which comprises reacting (A) an organic compound containing at least two groups selected from the class consisting of alcoholic hydroxyl groups, aromatic amino groups and aromatic aminomethyl groups, and (B) a poly(cyclic iminoether) in the presence of (C) a compound acting as an acid catalyst, at an elevated temperature.

41 Claims, No Drawings

PROCESS FOR PRODUCING A THERMOSET RESIN

This is a continuation-in-part application of U.S. patent application Ser. No. 137,950 filed on Dec. 28, 1987, and now abandoned.

This invention relates to a process for producing a thermoset resin. More specifically, it relates to a process for producing a thermoset resin having excellent thermal stability, chemical resistance and mechanical properties at a high rate of curing with excellent moldability.

With the recent technological advance, there has been a demand for resins having excellent thermal stability, mechanical properties and moldability. Particular attention has been paid to reactive-molding resins obtained by using reactive monomers or oligomers which permit molding and polymerization at the same time using materials having a relatively low viscosity. Polyurethane resins, polyurea resins, nylon resins, epoxy resins and unsaturated polyester resins, for example, are known as such reactive-molding resins and some of them have gained commercial acceptance.

These resins, however, have some shortcomings despite their utility, and do not have entirely satisfactory properties and moldability. For example, the polyurethane resins have low thermal stability, and the unsaturated polyester resins require much time for reaction and molding.

The following prior art has previously been known on the reaction of cyclic iminoethers.

Angew. Chem. Internat. Edit., vol. 5, No. 10, pages 875–888 (1966) discloses a process for producing an N-(2-arylaminoethyl)amide represented by the following formula (C)

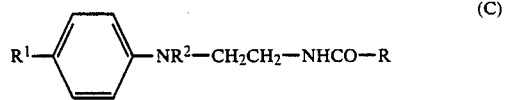

wherein R is ethyl or phenyl, and $R^1$ and $R^2$ are hydrogen or methyl, which comprises an oxazoline represented by the following formula (A)

wherein R is as defined, with an aromatic amine represented by the following formula (B)

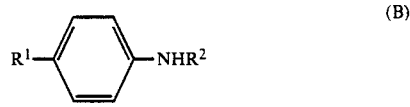

wherein $R^1$ and $R^2$ are as defined, in the presence of a small amount of a strong acid.

Japanese Patent Publication No. 57330/1986 discloses a process for producing an unsaturated polyester modified with an oxazoline, which comprises reacting an oxazoline derivative represented by the following formula

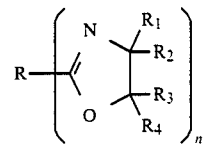

wherein R represents an aliphatic, alicyclic or aromatic hydrocarbon radical having a valence of n, $R_1$, $R_2$, $R_3$ and $R_4$ are identical or different and each represents hydrogen or a lower alkyl group, and n is an integer of 1 to 4, with a carboxyl-containing unsaturated polyester.

Japanese Laid-Open Patent Publication No. 22,366/1981 discloses a carboxyl-containing polymer having a softening point of at least 40° C. obtained by saponifying a copolymer of a vinyl ester of a saturated monocarboxylic acid and a vinyl monomer, and a powder paint composition comprising a compound having at least two oxazoline rings in the molecule.

U.S. Pat. No. 4,430,491 discloses a thermosetting polymeric composition prepared by effecting the step-growth polymerization reaction in the melt phase of a first reactant consisting of an oligomer containing a plurality of aromatic hydroxyl groups and a second reactant consisting of a compound having at least 2 oxazoline groups.

Japanese Laid-Open Patent Publication No. 68330/1984 discloses a process for producing an amide polymer which comprises reacting a linear polymer having an amide linkage with a compound having at least two 2-oxazolin-2-yl groups in the molecule under heat to add the 2-oxazolin-2-yl groups to the amide linkage.

U.S. Pat. No. 4,474,942 discloses a moldable crosslinked polyesteramide having the repeating unit structure of the formula $$-(RCONHCH_2CH_2OCOR'COOCH_2CH_2NHCO)_{\overline{n}}$$

wherein R and R' each are a bivalent hydrocarbon radical, and n is a positive integer, and produced by the reaction of a bis(2-oxazolin) compound and a dicarboxylic acid wherein at least 5% of the —NH— groups are crosslinked with the bis(2-oxazolin) ring compound by a ring-opening addition reaction.

U.S. Pat. No. 4,579,937 discloses a process for producing a crosslinked polyesteramide which comprises reacting a bis(2-oxazoline) compound with a dicarboxylic acid in a molar ratio of the dicarboxylic acid to the bis(2-oxazolin) compound of not more than about 1 at an elevated temperature in the presence of an oxazoline ring-opening polymerization catalyst.

Japanese Laid-Open Patent Publication No. 137927/1985 discloses a process for producing a thermoset resin which comprises reacting a polycarboxylic acid having an ester linkage in the molecule obtained by reacting a polyhydric alcohol with an excess of a polycarboxylic acid, with a bis(2-oxazoline) compound.

U.S. Pat. No. 4,558,114 discloses a process for preparing a tough, high-softening polymer comprising polymerizing a bicyclic amide acetal of the formula

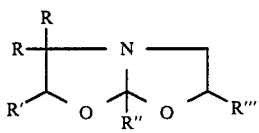

wherein R, R' and R''' independently represent hydrogen or an alkyl group having from 1 to 18 carbon atoms, R''' also represents an alkyl ether, an aryl ether or an alkaryl ether group having from 1 to 18 carbon atoms and R'' represents an alkyl group having from 1 to 18 carbon atoms or an alkaryl group having from 7 to 20 carbon atoms, an oxazoline of the formula

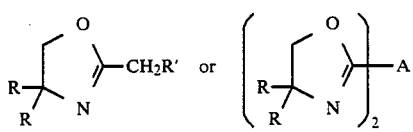

wherein R and R' independently represent hydrogen or an alkyl group having from 1 to 18 carbon atoms and A represents an alkylene group having from 1 to 20 carbon atoms, and a polyisocyanate at a temperature in the range of from about room temperature up to about 200° C. and at a pressure in the range of from about atmospheric up to about atmospheres.

U.S. Pat. No. 4,613,662 discloses a process which comprises copolymerizing an oxazoline with a bis- or poly-phenolic compound in the presence of a catalyst which conforms to the formula $M(X)_n$ where M represents an alkali or alkaline earth metal moiety, X represents $BF_3$, $BF_4$, $BPH_4$ or $ClO_4$, and n reperesents 1 or 2 at a temperature in the range of from about 100° to 200° C.

U.S. Pat. No. 4,640,969 discloses a process consisting essentially of interpolymerizing an oxazoline, a polyol and a polyisocyanate at a temperature in the range of from about 20° C. to about 100° C. at a pressure in the range of from atmospheric up to about 50 atmospheres wherein the oxazoline is one conforming to the formula

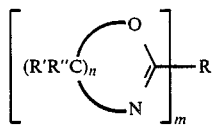

wherein n represents 2 or 3, m represents 1 or 2, and when m is 1, R represents an alkyl group containing from 1 to 20 carbon atoms and an alkaryl group containing from 7 to 20 carbon atoms; when m is 2, R represents an alkylene group containing from 1 to 19 carbon atoms and R' and R'' independently represent hydrogen, an alkyl group having from 1 to 10 carbon atoms or an aryl group containing from 6 to 12 carbon atoms.

Japanese Laid-Open Patent Publication No. 89,727/1987 discloses a process for producing a thermoset resin, which comprises heating a mixture composed of a bisoxazoline represented by the following formula

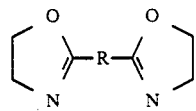

wherein R represents an alkylene having 1 to 20 carbon atoms, an arylene having 6 to 12 carbon atoms or an alkarylene having 7 to 20 carbon atoms, a polycarboxylic acid and a cation of an alkali metal or an alkaline earth metal as a catalyst at a temperature of about 100° C. to about 250° C. and a pressure of about atmospheric pressure to about 50 atmospheres.

Among the above processes, those in which oxazolines having at least two oxazoline rings in the molecule are used involve reacting the oxazolines with carboxylic acids, phenols or amides having high reactivity with the oxazolines, or else involve using other highly reactive compounds such as isocyanates together.

It is an object of this invention to provide a process for producing a thermoset resin which comprises using a poly(cyclic iminoether) as one reactant.

Another object of this invention is to provide a process for producing a thermoset resin, which comprises very rapidly reacting a poly(cyclic iminoether) with a compound having relatively low reactivity such as an aliphatic polyhydroxy compound in the presence of a catalyst.

Still another object of this invention is to provide a process for producing a thermoset resin by reaction molding such as two-package mixing type reaction molding by performing the above reaction in the absence of a solvent.

Yet another object of this invention is to provide a process for producing a thermoset resin having excellent thermal stability, chemical resistance and mechanical properties.

A further object of this invention is to provide a thermocurable composition which serves as a starting composition in the practice of the process of this invention.

A still further object of this invention is to provide a composite thermoset resin material comprising the thermoset resin produced by the process of this invention and reinforced fibers.

Other objects and advantages of this invention will become apparent from the following description.

According to this invention, the above objects and advantages of this invention are achieved firstly by a process for producing a thermoset resin, which comprises reacting (A) an organic compound containing at least two groups selected from the class consisting of alcoholic hydroxyl groups, aromatic amino groups and aromatic aminomethyl groups, said organic compound being a monomer, an oligomer or a polymer, and (B) a poly(cyclic iminoether) represented by the following formula (I)

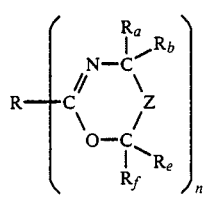
(I)

wherein n is an integer of 2 to 4, R represents a hydrocarbon group having a valence of n which may be interrupted or substituted by an atom other than carbon or a group containing an atom other than carbon, Z represents a direct bond or a group of the formula

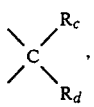

$R_a$, $R_b$, $R_c$, $R_d$, $R_e$ and $R_f$ are identical or different, and each represents a hydrogen atom, methyl, ethyl, propyl, phenyl, tolyl or benzyl with the proviso that when n is 2, R may also represent a direct bond,
with the proviso that when said organic compound (A) is a monomeric compound having at least two aromatic amino groups said poly(cyclic iminoether) (B) is the compound represented by the formula (I) wherein Z represents the of the formula

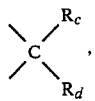

in the presence of
(C) a compound acting as an acid catalyst, at an elevated temperature.

When Z in formula (I) represents a direct bond, the poly(cyclic iminoether) of formula (I) shows oxazolines of the following formula (I-1)

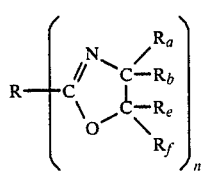
(I-1)

wherein $R_1$, $R_a$, $R_b$, $R_e$, $R_f$ and n are as defined with regard to formula (I), and when Z in formula is

the compound of formula (I) shows oxazines represented by the following formula (I-2)

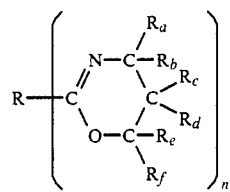
(I-2)

wherein R, $R_a$, $R_b$, $R_c$, $R_d$, $R_e$ and $R_f$ and n are as defined above.

The hydrocarbon group may be aliphatic, alicyclic or aromatic, and is preferably an aliphatic group having 1 to 10 carbon atoms, an alicyclic group having 5 to 10 carbon atoms, or an aromatic group having 6 to 12 carbon atoms.

When n is 2, examples of the hydrocarbon group preferably include alkylene groups having 1 to 10 carbon atoms such as methylene, ethylene, trimethylene, 1,2-propylene, tetramethylene, hexamethylene, neopentylene and decamethylene; divalent alicyclic groups having 5 to 10 carbon atoms such as cyclohexylene and

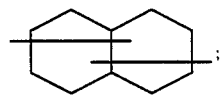

and divalent aromatic hydrocarbon groups containing 6 to 12 carbon atoms such as p-phenylene, m-phenylene, naphthylene and biphenylene. Likewise, when n is 3, examples of the hydrocarbon group preferably include

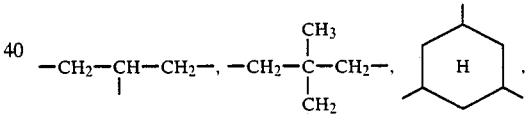

When n is 4, examples of the hydrocarbon group preferably include the following.

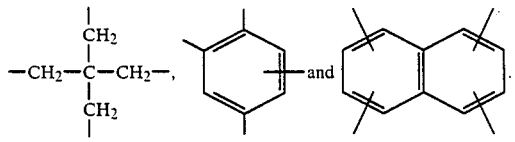

The hydrocarbon group may be interrupted by an atom other than carbon, such as oxygen atom, a sulfur atom, or —$NR_g$. $R_g$ is a hydrogen atom or a monovalent hydrocarbon group such as an alkyl group.

The above hydrocarbon group may be substituted by a group containing an atom other than carbon.

Examples of such a substituent group include chloro, bromo, nitro, methoxy, cyano, amide and acetamide.

In formula (I) given above $R_a$, $R_b$, $R_c$, $R_d$, $R_e$ and $R_f$ are identical or different, and each represents a hydrogen atom, methyl, ethyl, propyl, phenyl, tolyl or benzyl. Of these, hydrogen and methyl are preferred. Especially preferably, all of them are hydrogen atoms, or one of them is methyl and all others are hydrogen atoms.

Examples of the poly(cyclic iminoether) of formula (I) are given below.

Oxazolines of formula (I-1)

2,2'-bis(2-oxazoline),
2,2'-ethylenebis(2-oxazoline),
2,2'-tetramethylenebis(2-oxazoline),
2,2'-hexamethylenebis(2-oxazoline),
2,2'-octamethylenebis(2-oxazoline),
2,2'-1,4-cyclohexylenebis(2-oxazoline),
2,2'-bis(4-methyl-2-oxazoline),
2,2'-bis(5-methyl-2-oxazoline),
2,2'-m-phenylenebis(2-oxazoline),
2,2'-p-phenylenebis(2-oxazoline),
2,2'-m-phenylenebis(4-methyl-2-oxazoline),
2,2'-m-phenylenebis(5-methyl-2-oxazoline),
2,2'-p-phenylenebis(4-methyl-2-oxazoline),
2,2'-p-phenylenebis(5-methyl-2-oxazoline), and
1,3,5-tris(2-oxazolynyl-2)benzene.

Of these, 2,2'-bis(2-oxazoline), 2,2'-tetramethylenebis(2-oxazoline, 2,2'-m-phenylenebis(2-oxazoline), and 2,2'-p-phenylenebis(2-oxazoline) are preferred.

Oxazines of formula (I-2)

2,2'-bis(5,6-dihydro-4H-1,3-oxazine),
2,2'-ethylenebis(5,6-dihydro-4H-1,3-oxazine),
2,2'-tetramethylenebis(5,6-dihydro-4H-1,3-oxazine),
2,2'-hexamethylenebis(5,6-dihydro-4H-1,3-oxazine),
2,2'-octamethylenebis(5,6-dihydro-4H-1,3-oxazine),
2,2'-1,4-cyclohexylenebis(5,6-dihydro-4H-1,3-oxazine),
2,2'-bis(4-methyl-5,6-dihydro-4H-1,3-oxazine),
2,2'-bis(5-methyl-5,6-dihydro-4H-1,3-oxazine),
2,2'-bis(6-methyl-5,6-dihydro-4H-1,3-oxazine),
2,2'-m-phenylenebis(5,6-dihydro-4H-1,3-oxazine),
2,2'-p-phenylenebis(5,6-dihydro-4H-1,3-oxazine),
2,2'-m-phenylenebis(4-methyl-5,6-dihydro-4H-1,3-oxazine),
2,2'-m-phenylenebis(5-methyl-5,6-dihydro-4H-1,3-oxazine),
2,2'-m-phenylenebis(6-methyl-5,6-dihydro-4H-1,3-oxazine),
2,2'-p-phenylenebis(4-methyl-5,6-dihydro-4H-1,3-oxazine),
2,2'-p-phenylenebis(5-methyl-5,6-dihydro-4H-1,3-oxazine), and
2,2'-p-phenylenebis(6-methyl-5,6-dihydro-4H-1,3-oxazine).

Of these, 2,2'-bis(5,6-dihydro-4H-1,3-oxazine), 2,2'-tetramethylenebis(5,6-dihydro-4H-1,3-oxazine), 2,2'-m-phenylenebis(5,6-dihydro-4H-1,3-oxazine) and 7-phenylenebis(5,6-dihydro-4H-1,3-oxazine) are preferred.

These poly(cyclic iminoethers) may be used singly or in combination with each other. When two or more of them are used in combination, a combination of the oxazoline and the oxazine, a combination of oxazolines, or a combination of oxazines may be conveniently used.

In the process of this invention, the poly(cyclic iminoether) may, as required, be used together with not more than 30 mole %, preferably not more than 25 mole %, more preferably not more than 20 mole %, based on the poly(cyclic iminoether), of a mono(cyclic iminoether).

Examples of preferred mono(cyclic iminoethers) are monoxazoline compounds represented by the following formula (I-1)'

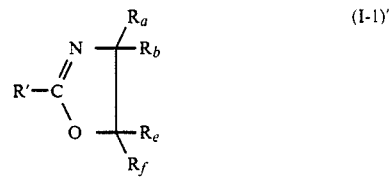

H wherein $R^1$ represents a monovalent hydrocarbon group, and $R_a$, $R_b$, $R_e$ and $R_f$ are as defined with regard to formula (I), and monoxazine compounds represented by the following formula (I-21)'

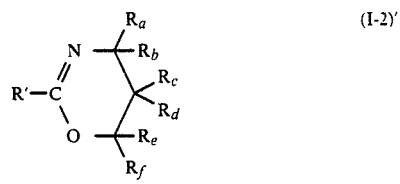

wherein R', $R_a$, $R_b$, $R_c$, $R_d$, $R_e$ and $R_f$ are as defined above.

Use of the mono(cyclic iminoether) together makes it possible to control the reaction and adjust the crosslinking density advantageously.

In formulae (I-1)' and (I-2)', R' is a monovalent hydrocarbon group which may be aliphatic, alicyclic or aromatic. Preferred hydrocarbon groups include aliphatic groups having 1 to 10 carbon atoms, alicyclic groups having 5 to 10 carbon atoms and aromatic groups having 6 to 12 carbon atoms.

Examples of the mono(cyclic iminoether) include monoxazolines such as 2-ethyl-2-oxazoline, 2-ethyl-2-oxazoline, 2-propenyl-2-oxazoline, 2-phenyl-2-oxazoline, 2-tolyl-2-oxazoline, 2,5-dimethyl-2-oxazoline, 2,4-dimethyl-2-oxazoline, 2-phenyl-4-methyl-2-oxazoline and -phenyl-5-methyl-2-oxazoline, and oxazines such as 2-methyl-5,6-dihydro-4H-1,3-oxazine, 2-ethyl-5,6-dihydro- 4H-1,3-oxazine, 2-propenyl-5,6-dihydro-4H-1,3-oxazine, 2-phenyl-5,6-dihydro-4H-1,3-oxazine, 2-tolyl-5,6-dihydro-4H-1,3-oxazine, 2-phenyl-4-methyl-5,6-dihydro-4H-1,3-oxazine, 2-phenyl-5-methyl-5,6-dihydro-4H-1,3-oxazine and 2-phenyl-6-methyl-5,6-dihydro-4H-1,3-oxazine.

Among these, 2-phenyl-2-oxazoline, 2-tolyl-2-oxazoline, 2-phenyl-5,6-dihydro-4H-1,3-oxazine and 2-tolyl-5,6-dihydro-4H-1,3-oxazine are preferred.

The organic compound (A), the other reactant used in this invention, contains at least two groups selected from alcoholic hydroxyl groups, aromatic amino groups and aromaic aminomethyl groups.

The organic compound (A) may be a low-molecular-weight compound or a high-molecular-weight compound; in other words, it may be a monomer, an oligomer or a polymer. Examples of the organic compound (A) include monomeric polyhydroxy compounds having at least two aliphatic or alicyclic alcoholic hydroxyl groups, oligomers or polymers having at least two aliphatic or alicyclic alcoholic hydroxyl groups, monomeric aromatic polyamines having at least two aromatic amino groups, monomeric aromatic polyamines having at least two aromatic aminomethyl groups, monomeric aromatic polyamines having an aromatic amino group and an aromatic aminomethyl group, polymers or oligomers having at least two groups selected from aromatic amino groups and aromatic aminomethyl groups as terminal groups, and compounds containing an alcoholic hydroxyl group and a group selected from aromatic amino groups and aromatic aminomethyl groups.

The monomeric polyhydroxy compounds having at least two aliphatic or alicyclic alcoholic hydroxyl groups preferably have a pKa value of at least 9.0 and contain 2 to 4 alcoholic hydroxyl groups in the molecule. Examples include ethylene glycol, propylene glycol, trimethylene glycol, butanediol, hexanediol, octanediol, decamethylene diol, diethylene glycol, triethylene glycol, glycerol, trimethylolpropane, pentaerythritol, neopentyl glycol, cyclohexanedimethanol, dihydroxycyclohexane and trihydroxycyclohexane.

The aliphatic or alicyclic oligomers or polymers having at least two alcoholic hydroxyl groups are preferably substantially linear and have a flow initiation temperature of not more than 300° C., especially not more than 280° C. It is to be understood in this invention that oligomers or polymers at least 50 mole %, preferably at least 60 mole %, more prefarably at least 70 mole %, above all at least 80 mole %, on an average, of the entire terminal groups are alcoholic hydroxyl groups have at least two alcoholic hydroxyl groups.

The aliphatic alcoholic hydroxyl groups are, for example, hydroxyl groups substituted on alkyl groups. The alicyclic alcoholic hydroxyl groups are, for example, hydroxyl groups substituted on saturated cyclic hydrocarbon groups such as cyclohexyl and cyclopentyl.

Examples of such oligomers or polymers are polyamides, polyethers, polysulfones, polyuretanes, polyesters, polyetherimides, polyetherketones, polysulfides, polyethylene, polystyrene and polybutadiene.

The polymers or oligomers having alcoholic hydroxyl groups as terminal groups can be produced by methods known per se.

The flow initiation temperature is the temperature at which a sample polymer can be melt-extruded under a pressure of 100 kg/cm$^2$ using a flow tester equipped with a nozzle, 0.5 mm in diameter and 1 mm in length. These polymers or oligomers may have an inherent viscosity of about 0.05 to 0.7.

The monomeric aromatic polyamines having at least two aromatic amino groups are preferably those in which the amino groups are primary and/or secondary. Preferably, the aromatic polyamines have 2 to 4, preferably 2, aromatic amino groups in the molecule. Examples include 4,4′-diaminodiphenylmethane, 3,3′-diaminodiphenylsulfone, 4,4′-diaminodiphenylether, 3,4′-diaminodiphenylether, 4,4′-diaminobenzophenone, 3,3′-diaminobenzophenone, o-phenylenediamine, m-phenylenediamine, diaminonaphthalene, 4,4′-diaminodiphenylene sulfide, 2,4-diaminotoluene, 2,6-diaminotoluene, 2,2-bis[4-(4-aminophenoxy)phenyl]-propane, 1,2-dianilinoethane and 4,4′-diaminodiphenyl.

The monomeric aromatic polyamines having at least two aromatic aminomethyl groups are preferably those in which the amino groups in the aminomethyl groups are primary and/or secondary Examples of suitable aromatic polyamines are p-xylylenediamine, m-xylylenediamine and a mixture thereof.

The monomeric aromatic polyamines having an aromatic amino group and an aromatic aminomethyl group are preferably those in which the aromatic amino group and the amino moiety of the aromatic aminomethyl group are both primary and/or secondary. Examples include p-aminomethylaniline and aminomethylaniline.

The polymers or oligomers having at least two groups selected from aromatic amino groups and aromatic aminomethyl groups are preferably substantially linear and have a melting point of not more than 300° C., especially not more than 280° C. It is to be understood in this invention that oligomers or polymers in which at least 50 mole %, preferably at least 60 mole %, more preferably at least 70 mole %, above all at least 80 mole %, on an average, of the entire terminal groups are aromatic amino groups and/or aromatic aminomethyl groups have at least two such amino groups and/or aminomethyl groups.

Examples of such oligomers or polymers include polyamides, polyethers, polysulfone, polyurethanes, polyesters, polyetherimides, polyetherketones, polyphenylene sulfides, polyethylene, polyazomethine and polyamideimides.

These oligomers or polymers can be produced by blocking the terminal groups of a normally available thermoplastic resin such as a polyamide with aromatic amino groups and/or aromatic aminomethyl groups by methods known per se. For example, terminal groups, such as carboxyl groups or amide-forming functional groups thereof such as ester or acid halide groups in an oligomer or polymer may be converted into aromatic amino groups and/or aromatic methylamino groups by reacting the oligomer or polymer with a diamino compound having aromatic amino groups and/or aromatic methylamino groups. Isocyanate terminal groups in an oligomer or a polymer may be converted to aromatic amino groups and/or aromatic methylamino groups by likewise reacting them with a diamino compound, or hydrolyzing them.

The compounds having an alcoholic hydroxyl group and a group selected from aromatic amino groups and aromatic aminomethyl groups are preferably those in which the alcoholic hydroxyl group is aliphatic or alicyclic, and the aromatic amino group and the amino moiety of the aromatic amino methyl group are primary and/or secondary. Examples include p-beta-hydroxyethoxyaniline, m-betahydroxyethoxyaniline, p-hydroxymethylaniline, m-hydroxymethylaniline, p-beta-hydroxyethylaniline, p-beta-hydroxyethylaniline, p-aminomethylbenzylalcohol, and m-aminomethylbenzylalcohol.

In the present invention, the organic compounds (A) may be used singly or in combination with each other.

In the process of this invention, the organic compound (A) and the poly(cyclic iminoether) (B) may be used in such proportions that basically the total amount of the alcoholic hydroxyl groups, aromatic amino groups and aromatic aminomethyl groups in the organic compound (A) is preferably 0.1 to 1.2 equivalents, more preferably 0.2 to 1.0 equivalent, especially preferably 0.5 to 0.9 equivalent, per equivalent of the iminoether groups of the poly(cyclic iminoether) (B).

If the organic compound (A) is an oligomer or polymer, the above proportions correspond to a (A)/(B)

weight ratio of from 90/10 to 37/70, preferably from 80/20 to 40/60.

The process of this invention is practiced by heating the organic compound (A) and the poly(cyclic iminoether) (b) in the presence of the compound (C) acting as an acid catalyst.

Examples of the compound (C) acting as an acid catalyst are given below.

(i) Protonic acids having a pKa of not more than 2.5

(ii) Esters of protonic acids having a pKa of not more than 1.0

(iii) Salts of protonic acids having a pKa of not more than 2.5

(iv) Lewis acids and complexes thereof (v) Alkyl halides (vi) Iodine (vii) Halogenophenols represented by the following formula (III)

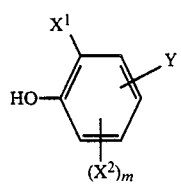

(III)

wherein $X^1$ and $X^2$ are identical or different, and each represents a halogen atom, m is 0, 1 or 2, Y is $-SO_2R_1$, $-COR_2$, $-CN$ or $-NO_2$, $R_1$ represents an alkyl group having 1 to 20 carbon atoms which may be substituted, an aryl group having 6 to 12 carbon atoms or $-NR_3R_4$, $R_2$ represents an alkyl group having 1 to 20 carbon atoms which may be substituted, a cycloalkyl group having 5 to 10 carbon atoms, an aryl group having 6 to 12 carbon atoms, $-OR_5$ or $-NR_6R_7$, and $R_3$, $R_4$, $R_5$, $R_6$ and $R_7$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms.

(viii) Halogenophthalic acids represented by the following formula (IV)

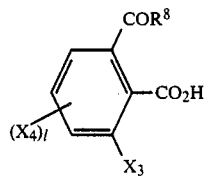

(IV)

wherein $X_3$ and $X_4$ are identical or different, and each is selected from the groups defined for $X_1$, l is a number of 0, 1, 2 or 3, and $R_8$ is selected from the groups defined for $R_2$, and/or halogenophthalic acid anhydrides represented by the following formula (V)

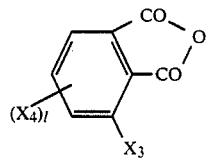

(V)

wherein $X_3$, $X_4$ and l are as defined above.

The protonic acids (i) having a pKa of not more than 2.5 in (i) are preferably organic sulfonic acids, phosphonic acids or inorganic acids Specific examples include organic sulfonic acids such as methanesulfonic acid, ethanesulfonic acid, benzenesulfonic acid, trifluoromethanesulfonic acid and p-toluenesulfonic acid, phosphonic acids such as phenylphosphonic acid, and inorganic acids such as sulfuric acid, phosphoric acid, phosphorous acid, phosphinic acid and perchloric acid.

The esters (ii) of protonic acids having a pKa of not more than 1.0 are preferably esters of organic sulfonic acids and esters of inorganic protonic acids. The alcohol components forming the esters are preferably aliphatic alcohols having 1 to 10 carbon atoms. Specific examples of the esters (ii) are sulfonic acid esters such as methyl benzenesulfonate, ethyl benzenesulfonate, methyl p-toluenesulfonate, ethyl trifluoromethanesulfonate and ethyl D-toluenesulfonate, and esters of inorganic protonic acids such as dimethyl sulfate The salts (iii) of protonic acids having a pKa of not more than 2.5 are preferably salts of the protonic acids (i), for example salts with organic amine compounds such as hexmethylenediamine, piperazine, m-xylylenediamine, 4,4'-diaminodiophenylmethane, pyridine, and 2,2'-m-phenylenebis(2-oxazoline).

Examples of preferred Lewis acids and complexes thereof (iv) include such Lewis acids as titanium tetrachloride, tin tetrachloride, zinc chloride, aluminum chloride and boron trifluoride, and complexes of these Lewis acids with ethers or phenols, such as boron trifluoride etherate.

Preferred alkyl halides (v) are alkyl iodides and alkyl bromides. The alkyl group in the alkyl halide (v) preferably has 1 to 10 carbon atoms, and may be substituted by phenyl. Specific examples of the alkyl halide (v) are methyl iodide, ethyl iodide, propyl iodide, butyl iodide, benzyl iodide and benzyl bromide.

The iodine (vi) is elemental iodine.

The halogenophenol (vii) of formula (III) are one type of preferred catalysts.

In formula (III), $X^1$ and $X^2$ are identical or different, and each represents a halogen atom. Chlorine and bromine atoms are especially preferred as the halogen atom. m is a number of 0, 1 or 2, preferably 1. When m is 1, $X^2$ is especially preferably bonded at the ortho-position to the hydroxyl group in formula (III).

Y is $-SO_2R_1$, $-COR_2$, $-CN$ or $-NO_2$. Formula (III) may be written as follows according to the definition of Y.

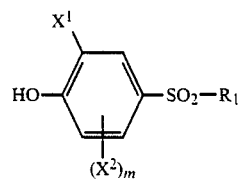

(III-1)

wherein $X^1$, $X^2$ and m are as defined, $R_1$ represents an alkyl group having 1 to 20 carbon atoms which may be substituted, an aryl group having 6 to 12 carbon atoms which may be substituted, or $-NR_3R_4$ in which $R_3$ and $R_4$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms

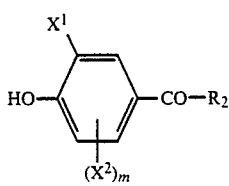

wherein $X^1$, $X^2$ and m are as defined above, and $R_2$ represents an alkyl group having 1 to 20 carbon atoms which may be substituted, a cycloalkyl group having 5 to 10 carbon atoms, an aryl group having 6 to 12 carbon atoms, $-OR_5$ or $-NR_6R_7$ in which $R_5$, $R_6$ and $R_7$ are identical or different and each represents a hydrogen atom, an alkyl group having 1 to 20 carbon atoms which may be substituted, a cycloalkyl group having 5 to 10 carbon atoms or an aryl group having 6 to 12 carbon atoms.

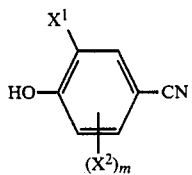

wherein $X^1$, $X^2$ and m are as defined above.

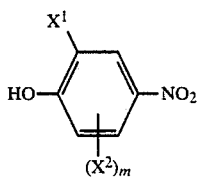

wherein $X^1$, $X^2$ and m are as defined above.

In formula (III-1), the $C_1$–$C_{20}$ alkyl group for $R_1$ may be linear or branched, and preferably has 1 to 10 carbon atoms. Examples of the alkyl group are methyl, ethyl, n-propyl, isopropyl, n-butyl, isobutyl, sec-butyl, tert-butyl, n-pentyl, n-hexyl, n-heptyl, n-octyl, n-nonyl, n-decyl and n-dodecyl groups. These alkyl groups may be substituted by a substituent selected from, for example, halogens, a hydroxyl group, a carbonyl group, a nitro group, a cyano group, an amino group, alkoxy groups, alkoxycarbonyl groups, acyl groups and acyloxy groups.

Examples of the aryl group having 6 to 12 carbon atoms for $R_1$ are phenyl, tolyl and naphthyl groups. These aryl groups may be substituted by the same substituents as exemplified above as substituents for the alkyl groups.

The optionally substituted $C_1$–$C_{12}$ alkyl groups and $C_6$–$C_{12}$ aryl groups for $R_3$ or $R_4$ in the group represented by $R_1$ may be the same as those exemplified above with regard to $R_1$. Examples of the $C_5$–$C_{10}$ cycloalkyl groups for $R_3$ or $R_4$ are cyclopentyl, cyclohexyl and

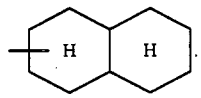

Specific examples of the compounds of formula (III-1) include bis(3,5-dichloro-4-hydroxyphenyl)sulfone, bis(3,5-dibromo-4-hydroxyphenyl)sulfone, 3,5-dichloro-4-hydroxybenzenesulfonamide, 3,5-dibromo-4-hydroxybenzenesulfonamide, and 3,5-dibromo-4-hydroxybenzenesulfonic acid N-methylamide.

The optionally substituted $C_1$–$C_{20}$ alkyl group, the $C_5$–$C_{10}$ cycloalkyl group, and the $C_6$–$C_{12}$ aryl group for $R_2$ in formula (III-2) may be the same as those exemplified above with regard to formula (III-1) $R_6$ and $R_7$ in the group $-NR_6R_7$ may be the same as those exemplified above with regard to $R_3$ $R_4$.

Examples of group $R_5$ in the group $-OR_5$ represented by $R_2$ may be the same as those given above with regard to groups $R_3$ and $R_4$.

Specific examples of the compounds of formula (III-2) include bis(3,5-dichloro-4-hydroxyphenyl)ketone, bis(3,5-dibromo-4-hydroxyphenyl)ketone, methyl 3,5-dichloro-4-hydroxybenzoate, methyl 3,5-dibromo-4-hydroxybenzoate, methyl 3,5-dibromo-4-hydroxybenzoate, 3,5-dibromo-4-hydroxybenzamide, 3,5-dibromo-4-hydroxybenzoic acid N-ethylamide, and 3,5-dibromo-4-hydroxybenzoic acid.

Examples of the compounds of formula (III-3) include 3,5-dichloro-4-hydroxy-benzonitrile, and 3,5-dibromo-4-hydroxybenzonitrile.

Examples of the compounds of formula (III-4) include 3,5-dichloro-4-hydroxynitrobenzene, and 3,5-dibromo-4-hydroxynitrobenzene.

Of the halogenophenols of formula (III), those having a 4-hydroxy-3,5-dichlorophenyl or 4-hydroxy-3,5-dibromophenyl skeleton are preferred, and (3,5-dibromo-4-hydroxyphenyl)sulfone is particularly preferred.

The halogenophthalic acids of formula (IV) and/or the halogenophthalic acid anhydrides of formula (V) in (viii) above are also a preferred type of catalysts.

In formula (IV), $X_3$ and $R_4$ represent the same halogen atoms defined with regard to $X_1$, such as chlorine and bromine atoms. l is a number of 0, 1, 2 or 3. Preferably, l is 1, 2 or 3, above all 2 or 3. $R_8$ in formula (IV) is the same as $R_2$ in formula (III).

In formula (V), $X_3$, $X_4$ and l are as defined for formula (IV).

Examples of the compounds of formula (IV) and (V) are given below.

(i) Dicarboxylic acids and their anhydrides
 3,4,5,6-tetrabromo(or tetrachloro)phthalic acid, 3,4,5,6-tetrabromo(or tetrachloro)phthalic anhydride, 3,4,5-tribromo(or trichloro)phthalic acid, 3,4,5-tribromo(or trichloro)phthalic anhydride, 3,4,6-tribromo(or trichloro)phthalic acid, and 3,4,6-tribromo(or trichloro)phthalic anhydride.

(ii) Monoesters of dicarboxylic acids
 monomethyl 3,4,5,6-tetrabromo(or tetrachloro)phthalate, monoethyl 3,4,5,6-tetrabromo(or tetrachloro)phthalate, monopropyl 3,4,5,6-tetrabromo(or tetrachloro)phthalate, monoisopropyl 3,4,5,6-tetrabromo( or tetrachloro)phthalate, monobenzyl 3,4,5,6-tetrabromo(or tetrachloro)phthalate, monobenzyl 3,4,5,6-tetrabromo(or tetrachloro)phthalate, and monophenyl 3,4,5,6-tetrabromo(or tetrachloro)phthalate.

(iii) Dicarboxylic acid monoamides 3,4,5,6-tetrabromo(or tetrachloro)phthalic monoamide, N-methyl-3,4,5,6-tetrabromo(or tetrachloro)phthalic monoamide, N-ethyl-3,4,5,6-tetrabromo(or tetrachloro)phthalic monoamide, N-propyl-3,4,5,6-tetrabromo(or tetrachloro)phthalic monoamide, N-decyl-3,4,5,6-tetrabromo(or tetrachloro)phthalic monoamide, and N-phenyl-3,4,5,6-tetrabromo(or tetrachloro)phthalic monoamide.

(iv) Ketocarboxylic acids 2-carboxy-3,4,5,6-tetrabromo(or tetrachloro)phenylmethyl ketone and 2-carboxy-3,4,5,6-tetrabromo(or tetrachloro)phenylethyl ketone.

Among these, the dicarboxylic acids and anhydrides thereof are preferred. Tetrachlorophthalic acids, tetrabromophthalic acids, and anhydrides of these are more preferred. Particularly preferred are 3,4,5,6-tetrabromo(or tetrachloro)phthalic acid and 3,4,5,6-tetrabromo(or tetrachloro)phthalic anhydride.

The above exemplified catalyst compounds may be used singly or in combination as the catalyst (C) in the process of this invention. The amount of the catalyst (C) is usually 0.01 to 20 mole %, preferably 0.1 to 10 mole %, based on the poly(cyclic iminoether) (B).

The process of this invention is carried out by reacting the organic compound (A) and the poly(cyclic iminoether) (B) in the presence of the catalyst (C) at an elevated temperature with the proviso that when said organic compound (A) is a monomeric compound having at least two aromatic amino groups said poly(cyclic iminoether) (B) is the compound represented by the formula (I) wherein Z represents the group of the formula

The reaction is carried out after an mixture of the organic compound (A), the poly(cyclic iminoether) (B) and the catalyst (C) is prepared, or by suitably mixing these components (A), (B) and (C), for example by preparing a mixture of part of the organic compound (A) and the catalyst (C) and a mixture of the remainder of the organic compound (A) and the poly(cyclic iminoether) (B). Usually, mere mixing of these compounds does not initiate the reaction at a sufficient rate. The reaction is carried out, for example, by heat-melting the intimate mixture of the components (A), (B) and(C), filing the molten mixture in a mold of the desired shape, and reacting the mixture in the mold under heat (one-package method) or by mixing the two mixtures as prepared above by a mixing means such as a mixing head, directly putting the mixture into a mold of the desired shape heated in advance to the reaction temperature and thus performing the reaction (two-package method).

Generally, oligomers or polymers have a high flow initiation temperature or melting point. If the organic compound (A) is an oligomer or polymer, it is desirable to prepare a mixture of (A), (B) and (C) by first mixing the oligomer or polymer with the poly(cyclic iminoether), and mixing the resulting mixture with the catalyst (C) at a relatively low temperature because the plasticizing effect of the poly(cyclic ainminoether) (B) can lower the flow initiation temperature of the oligomer or polymer (A).

The optimum reaction temperature differs with the types and amounts of the starting materials and the catalyst, etc. Usually, the reaction is carried out at a temperaure of 60° to 340° C., preferably 80° to 260° C.

The reaction time may be one which is sufficient for curing the desired resin, and may vary depending upon the types and amounts of the starting materials, and the reaction temperature. It is preferably 10 seconds to 60 minutes, more preferably 20 seconds to 30 minutes, especially preferably about 30 seconds to 15 minutes.

The reaction may be carried out under atmospheric to elevated pressures. Preferably, the reaction is carried out in an atmosphere of an inert gas such as nitrogen or argon to avoid the inclusion of water in the atmosphere or to prevent oxidative degradation of the resin.

The process of this invention can give a thermosetting resin having excellent thermal stability, chemical resistance and mechanical properties at high rates of curing with excellent moldability.

Investigations of the present inventors have shown that when a specific compound having a phenolic hydroxyl group which differs from the organic compound (A) is used instead of the compound (A), the objects of this invention can equally be achieved by using a compound acting as an acid catalyst.

Accordingly, the present invention also provides a process for producing a thermoset resin, which comprises reacting (A') an organic compound containing at least two phenolic hydroxyl groups, or at least one phenolic hydroxyl group and at least one group selected from alcoholic hydroxyl groups, aromatic amino groups and aromatic aminomethyl groups, the phenolic hydroxyl groups being partly or wholly the 1-hydroxy group of a 1-hydroxydihalophenyl group free from an electron attracting atom or group other than halogen atoms, and (B) the poly(cyclic iminoether) represented by formula (I), in the presence of a compound acting as an acid catalyst, at an elevated temperature.

Suitable compounds having at least two phenolic hydroxyl groups (A') include, for example, compounds of the following formula (II)

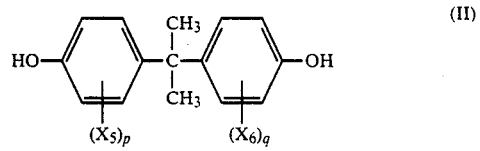

wherein $X_5$ and $X_6$ are identical or different and each represents a chlorine or bromine atom, and p and q are identical or different and each is 1 or 2.

As can be seen from formula (II), the compounds of formula (II) do not have an electron attracting atom or group at sites other than halogen atoms ($X_5$, $X_6$).

In formula (II), $X_5$ and $X_6$ are identical or different and each represents a chlorine or bromine atom, and p and q are identical or different and each represents 1 or 2.

Specific examples of the compounds of formula (II) are 2,2-bis(3-chloro-4-hydroxyphenyl)propane, 2,2-bis(3,5-dichloro-4-hydroxyphenyl)propane, 2,2-bis(3-bromo-4-hydroxyphenyl)propane, and 2,2-bis(3,5-dibromo-4-hydroxyphenyl)propane.

The poly(cyclic iminoethr) (B) and the catalyst (C) in the other aspect of the process of this invention are the same as described hereinabove. The reaction may be carried out under the same conditions as in the first aspect of the invention already described hereinabove.

The other aspect of the process of this invention can equally give a thermoset resin having the excellent properties described hereinabove.

As required, reinforcing materials such as carbon fibers, aramid fibers, and glass fibers, various fillers such as titanium dioxide, calcium carbonate, alumina, talc, clay, diatomaceous earth, zinc flower, carbon black, barium sulfate, graphite, red iron oxide, re lead, glass powders, mica, silica and various metal powders, pigments, coloring agents, oxidation stabilizers, ultraviolet absorbers, mold releasing agents thermoplastic resins such as polyethylene, polypropylene, polystyrene, polysulfones, polyethersulfones, acrylic resins, polyetherimides, polycarbonates, polyethers and polyolefins and other additives may be properly incorporated in the reaction system in carrying out the process of this invention.

For example, by carrying out the process of this invention in the presence of reinforcing materials such as carbon fibers and glass fibers, a composite thermoset resin material containing the reinforming materials can be produced.

In addition to the reaction components (A) and (B), or (A') and (B), a polyisocyanate compound may be used as a third reaction component in the practice of the process of this invention. Aromatic, aliphatic or alicyclic compounds having at least 2 isocyanate groups and modified products thereof may be used as the polyisocyanate compound. Examples of the aromatic polyisocyanate compounds are 2,4-tolylene diisocyanate, 2,6-tolylene diisocyanate, 4,4'-diphenylmethane diisocyanate, polymethylene polyphenylisocyanate, and xylylene diisocyanate. Examples of the alicyclic polyisocyanate compounds are isophorone diisocyanate and methylenebis(cyclohexyl isocyanate). Hexamethylene diisocyanate is an example of the aliphatic polyisocyanate. Examples of the modified products are dimers, trimers, prepolymer-type modification products, carbodiimide modified products and urea modified products of the above-exemplified polyisocyanate. These polyisocyanate compounds may be used in combination.

Among them, 4,4'-diphenylmethane diisocyanate and modified products thereof are especially preferably used as the polyisocyanate compound.

The amount of the polyisocyanate compound is 0.1 to 9 equivalents per equievalent of the iminoether groups of the compounds (B).

The following examples illustrate the present invention in greater detail. It should be understood that the invention is not limited to these examples.

All "parts" in these examples are by "weight". The heat distortion temperature was measured by a dynamic thermomechanical property tester at a temperature elevating rate of 10° C./min.

EXAMPLES 1-2

21.6 Parts of 2,2'-m-phenylenebis(2-oxazoline), 7.7 parts of p-toluenesulfonic acid, and each of the polyhydroxy compounds indicated in Table 1 in the indicated amount were well mixed in a glass reactor. Then, the inside of the reactor was purged with nitrogen, and the mixture was heated to 170° C. Reaction immediately began, and within 1 minute, the mixture attained a temperature of about 300° C. and curing occurred.

The resulting resin was transparent and tough, and showed a heat distortion temperature indicated in Table 1. It had excellent thermal stability and good solvent stability such that it did not dissolve nor swell in acetone.

TABLE 1

| Example | Polyhydroxy compound | Amount (parts) | Maximum temperature attained (°C.) | Time (seconds) until the maximum temperature was attained | Heat distortion temperature (°C.) |
|---|---|---|---|---|---|
| 1 | 1,4-cyclohexanedimethanol | 7.2 | 309 | 30 | 194 |
| 2 | diethylene glycol | 6.4 | 293 | 42 | 164 |

EXAMPLE 3

2.16 Parts of 2,2'-m-phenylenebis(2-oxazoline), 2.00 parts of polyethylene glycol having an average molecular weight of 400 and 0.05 part of p-toluenesulfonic acid were put in a glass reactor, and after purging with nitrogen, heated to 170° C. The reaction immediately began, and in 55 seconds, the mixture attained a temperature of 270° C. and curing occurred. The resulting resin had a heat distortion temperature of 68° C.

EXAMPLES 4 and 5

In each run, 21.6 parts of 2,2'-m-phenylenebis(2-oxazoline), each of the polyamine compounds indicated in Table 2 and each of the catalysts indicated in Table 2 in the indicated amounts were charged into a glass reactor and well mixed. After purging with nitrogen, the mixture was heated to a predetermined temperature. The reaction product uniformly dissolved, and then cured over the period indicated in Table 2. The resulting resin was pale brown to yellow and transparent.

The heat distortion temperatures of the resulting resins are shown in Table 2. All of them are seen to have excelent thermal stability.

TABLE 2

| Example | Amount of the polyamine compound (parts) | Amount of the catalyst | Heating temperature (°C.) | Curing time (sec.) | Heat distortion temperature (°C.) | Chemical resistance (change in acetone) |
|---|---|---|---|---|---|---|
| 4 | m-xylylenediamine (13.0) | m-xylylenediamine (13.0) | 240 | 120 | 90 | 90 |
| 5 | 4,4'-diaminodiphenyl methane (13.9) | bis(3,5-dibromo-4-hydroxyphenyl)-sulfone (1.4) | 220 | 30 | 177 | 177 |

EXAMPLES 6-8

In each run, 100 parts of 2,2'-m-phenylenebis(5,6-dihydro-4H-1,3-oxazine), each of the polyhydroxy compounds, each of the polyamine compounds and each of the catalysts indicated in Table 3 in the amounts indicated were put into a glass reactor, and after purging with nitrogen, heated to 170° to 180° C. Reaction immediately began, and after each of the periods indicated in Table 3, the mixture reached a maximum temperature. The resin obtained was pale yellow to pale brown, clear and tough. The heat-distortion temperature of the resulting resin is shown in Table 3, and its excellent thermal stability can be seen from it.

TABLE 3

| Example | Polyhydroxy compound (amount in parts) | Polyamine compound (amount in parts) | Catalyst (amount in parts) | Reaction time (seconds) | Heat distortion temperature (°C.) |
|---|---|---|---|---|---|
| 6 | none | 4,4'-diamino-diphenylmethane (56) | ethyl benzene sulfonate (3) | 55 | 125 |
| 7 | 1,4-cyclohexane-dimethanol (12) | 4,4'-diamino-diphenylmethane (32) | ethyl p-toluene-sulfonate (4) | 50 | 148 |
| 8 | diethylene glycol (26) | none | methyl iodide (4) | 80 | 135 |

When the resulting resins were immersed in acetone and trichloroethylene at room temperature for 3 days. They did not dissolve nor swell, and showed excellent solvent resistance.

EXAMPLE 9

108 Parts of 2,2'-m-phenylenebis(2-oxazoline), 124 parts of 2,2'-m-phenylenebis(5,6-dihydro-4H-1,3-oxazine), 300 parts of 2,2-bis(3,5-dibromo-4-hydroxyphenyl)propane, and 8 parts of p-toluenesulfonic acid were put in a glass reactor, and after purging with nitrogen, heated to 170° C. Reaction immediately began, and in 35 seconds, the mixture attained a maximum temperature and cured. The resulting resin was very tough, and had excellent thermal stability as shown by its heat distortion temperature of 160° C.

EXAMPLE 10

21.6 Parts of 2,2'-m-phenylenebis(2-oxazoline), 27.2 parts of 2,2-bis(3,5-dibromo-4-hydroxyphenyl)propane and 1.4 parts of (3,5-dibromo-4-hydroxyphenyl)sulfone were put in a glass reactor, and well mixed. The inside of the reactor was purged with nitrogen, and the mixture was uniformly melted at about 150° C., and then reacted at 220° C. for 5 minutes. As a result, it cured to form a brown, clear tough resin. The resulting resin had a heat distortion temperature of 202° C. It was not attacked in acetone under reflux and showed excellent solvent resistance.

EXAMPLE 11

24.4 Parts of 2,2'-m-phenylenebis(5,6-dihydro-4H-1,3-oxazine), 17.8 parts of 4,4'-diaminodiphenylmethane and 2.8 parts of bis-(3,5-dibromo-4-hydroxyphenyl)sulfone were put in a glass reactor, and well mixed. Then, the inside of the reactor was purged with nitrogen, and the mixture was heated to 230° C. to melt it. The reaction immediately began, and after 70 seconds, the mixture attained a temperature of 282° C., and curing occurred. The resulting resin was brown, transparent and tough, and had a heat-distortion temperature of 128° C.

EXAMPLE 12

Twenty parts of 2,2'-m-phenylenebis(2-oxazoline), 20 parts of 2,2'-m-phenylenebis(5,6-dihydro-4H-1,3-oxazine), 24 parts of 3,4'-diaminodiphenyl ether and 3 parts of bis(3,5-dibromo-4-hydroxyphenyl)sulfone were put in a glass reactor, and well mixed. After purging with nitrogen, the mixture was heated to 220° C. to melt it. The reaction immediately began, and after 60 seconds, the mixture attained a temperature of 270° C., and curing occurred. The resulting resin was brown, transparent and tough, and had a heat distortion temperature of 186° C.

EXAMPLES 13-15

In each run, 31.2 Parts of 2,2'-m-phenylenebis(2-oxazoline) and each of the diamines indicated in Table 4 and each of the catalyst indicated in Table 4 in the amounts indicated were put into a glass reactor, and well mixed. After purging with nitrogen, the mixture was reacted under the reaction conditions shown in Table 4. Curing occurred, and a pale yellow, transparent and tough resin was obtained. The heat-distortion temperature of the resin is shown in Table 4. The resulting resin did not undergo change in acetone under reflux and showed excellent solvent resistance.

TABLE 4

| Example | Diamine (amount in parts) | Catalyst (amount in parts) | Reaction condition Temperature (°C.) | Time | Heat distortion temperature (°C.) |
|---|---|---|---|---|---|
| 13 | m-xylylenediamine (13.8) | bis(3,5-dibromo-4-hydroxyphenylsulfone | 220 | 8 min. | 130 |
| 14 | 4,4'-diaminodiphenyl-methane (20.0) | tetrabromophthalic anhydride (3.4) | 210 | 15 sec. | 180 |
| 15 | m-xylylenediamine (13.8) | tetrachlorophthalic anhydride (2.1) | 170 | 10 min. | 125 |

EXAMPLE 16

One hundred parts of 2,2'-p-phenylenebis(5,6-dihydro-4H-1,3-oxazine), 73 parts of 4,4'-diaminodiphenylmethane and 2.5 parts of 3,4,5,6-tetrachlorophthalic acid were put into a glass reactor, and melt-mixed at 165° C. It cured in 20 minutes to give a transparent resin.

The resin had a heat distortion temperature of 135° C., and did not undergo change in acetone under reflux showing excellent solvent resistance.

EXAMPLE 17

31.2 Parts of 2,2'-m-phenylenebis(2-oxazoline), 37.1 parts of 2,2-bis4-(4-aminophenoxy)phenyl)propane and 4 parts of 3,4,5,6-tetrabromophthalic acid N-phenylmonoamide were put into a glass reactor, and melt-mixed at 208° C. In 30 seconds, the mixture attained a temperature of 265° C., and cured.

The resulting resin was brown and tough, and had a heat distortion temperature of 185° C. It did not undergo change in acetone under reflux.

EXAMPLE 18

One hundred parts of 2,2'-m-phenylenebis(2-oxazoline), 140 parts of 2,2-bis(3,5-dibromo-4-hydroxyphenyl)propane and 10 parts of 3,4,5,6-tetrabromophthalic anhydride were put into a glass reactor, and well mixed. After nitrogen purging, the mixture was melted at 180° C. It attained a maximum temperature of 250° C., and cured.

The resulting resin was tough and had a heat distortion temperature of 220° C. It did not change at all in acetone under reflux, and showed excellent solvent resistance.

EXAMPLE 19

31.2 Parts of 2,2'-m-phenylenebis(2-oxazoline) and 10 parts of 4,4'-diaminodiphenylmethane were put into a glass reactor and well mixed, and then the reactor was purged with nitrogen. Then, 10 parts of 4,4'-diaminodiphenylmethane and 3.4 parts of 3,4,5,6-tetrabromophthalic anhydride were put into another glass reactor and well mixed, and then the reactor was purged with nitrogen. The mixtures were individually melted at 140° C., and immediately then, mixed. The mixture was filled in a mold kept at 160° C. under nitrogen, and reacted for 30 minutes. A brown, transparent and tough resin plate free from voids was obtained.

The resin had a softening point of 182° C. It did not change at all in acetone under reflux, and showed excellent solvent resistance.

EXAMPLE 20

354 Parts of 4,4'-diphenylmethane diisocyanate and 100 parts of diethylene glycol were dissolved in 1600 parts of dioxane. The solution was heated under reflux, and the terminals of the oligomer were hydrolyzed with an aqueous solution of hydrochloric acid to give a polymer having aromatic amino groups at the terminals. The polymer had an inherent viscosity of 0.11 and a heat distortion temperature of 82° C.

Two hundred parts of the oligomer (component A) and 200 parts of 2,2'-m-phenylenebis(2-oxazoline) (component B) were uniformly melt-mixed at 140° C., and then 7 parts of ethyl p-toluenesulfonate was added and mixed. In 50 seconds, the reaction mixture attained at temperature of 240° C. to give a crosslinked resin.

The resulting resin had a heat-distortion temperature of 266° C., and did not change at all in NMP and acetone.

EXAMPLES 21-23

In each run, 318 parts of diphenyl isophthalate and 122 parts of m-xylylenediamine were charged into a reactor equipped with a stirrer, and the mixture was heated to 260° C. in a stream of nitrogen. The phenol formed was evaporated out of the system. After 60 minutes, 40 parts of 4,4'-diaminodiphenylmethane was added to the reaction product, and further reacted for 60 minutes. The resulting polymer had a viscosity of 0.22 and a heat distortion temperature of 181° C. Then, 100 parts of the polymer and 2,2'-m-phenylenebis(5,6-dihydro-4H-1,3-oxazine) in the amount indicated in Table 5 were melt-mixed at 260° C. in a twin-screw extruder. The resulting composition had a flow initiation temperature of less than 150° C. The composition was then uniformly mixed with each of the catalysts indicated in Table 5 in the indicated amount at 140° C., and the mixture was filled in a mold heated at 180° C., and maintained for 15 minutes. The properties of the molded article are shown in Table 5.

TABLE 5

| Example | Amount of 2,2'-m-phenylenebis-(5,6-dihydro-4H-1,3-oxazine) (parts) | Catalyst (parts) | Properties of the molded article | |
|---|---|---|---|---|
| | | | Tg (°C.) | State during immersion in NMP |
| 21 | 70 | ethyl p-toluenesulfonate (3) | 229 | No change |
| 22 | 100 | butyl iodide (3) | 251 | '' |
| 23 | 150 | iodine (5) | 259 | '' |

EXAMPLES 24-26

Diphenyl isophthalate (159 parts) and 82 parts of m-xylylenediamine were reacted at 260° C. as in Example 26 while the phenol formed was evaporated out of the system. The resulting polymer had an inherent viscosity of 0.12 and a heat distortion temperature of 151° C.

In ech run, 100 parts of the resulting polymer was melt-mixed with 2,2'-m-phenylenebis(2-oxazoline) in each of the amounts indicated in Table 6 at 260° C. in a stream of nitrogen. The resulting mixture had a flow initiation temperature of less than 150° C. Then, the mixture was uniformly mixed with each of the catalyst shown in Table 6 in the amount indicated at 130° C. The mixture was filled in a mold kept at 200° C. and maintained for 15 minutes. The resulting article had the properties shown in Table 6.

TABLE 6

| Example | Amount of 2,2'-m-phenylenebis-(2-oxazoline) (parts) | Catalyst (parts) | Properties of the molded article | |
|---|---|---|---|---|
| | | | Tg (°C.) | State during immersion in NMP |
| 24 | 70 | ethyl p-toluenesulfonate (3.5) | 237 | No change |
| 25 | 100 | p-toluenesulfonic acid | 261 | '' |

TABLE 6-continued

| Example | Amount of 2,2'-m-phenylenebis-(2-oxazoline) (parts) | Catalyst (parts) | Tg (°C.) | State during immersion in NMP |
|---|---|---|---|---|
| 26 | 150 | (3.0) benzenesulfonic acid (2.5) | 272 | " |

EXAMPLES 27–29

The procedure of Examples 21 to 23 was repeated except that 79 parts of 4,4'-diaminodiphenylmethane was used instead of 109 parts of m-xylylenediamine. The resulting polymer had an inherent viscosity of 0.24 and a heat distortion temperature of 183° C.

In each run, 100 parts of the polymer was melt mixed at 260° C. with 2,2'-m-phenylenebis(2-oxazoline) in each of the amounts indicated in Table 7 by using a twin-screw extruder. The resulting composition had a flow initiation temperature of less than 150° C. One hundred parts of the composition was uniformly mixed with a predetermined amount of bis(3,5-dibromo-4-hydroxyphenyl)sulfone at 155° C. and the mixture was charged into a mold kept at 200° C., and maintained for 15 minutes. The resulting molded article had the properties shown in Table 7.

TABLE 7

| Example | Amount of 2,2'-m-phenyl-enebis(2-oxa-zoline) (parts) | Amount of bis-(3,5-dibromo-4-hydroxy-phenyl)sulfone (parts) | Tg (°C.) | State during immersion in NMP |
|---|---|---|---|---|
| 27 | 40 | 3.7 | 239 | No change |
| 28 | 70 | 5.3 | 261 | " |
| 29 | 100 | 6.5 | 282 | " |

EXAMPLES 30–32

The procedure of Examples 24 to 26 was repeated except that the amount of m-xylylenediamine was changed to parts. The resulting polymer had an inherent viscosity of 0.15 and a heat distortion temperature of 152° C.

One hundred parts of the polymer was melt-mixed at 260° C. with 2,2'-m-phenylenebis(5,6-dihydro-4H-1,3-oxazine) in each of the amounts indicated in Table 8 in a stream of nitrogen. The mixture had a low initiation temperature of less than 150° C. One hundred parts of the composition was uniformly mixed at 150° C. with each of the halogenophenols indicated in Table 8 in the indicated amount. The mixture was then charged into a mold kept at 200° C., and maintained for 15 minutes. The resulting molded article had the properties shown in Table 8.

TABLE 8

| Example | Amount of 2,2'-m-phenylene-bis(5,6-dihydro-4H-1,3-oxazine) (parts) | Amount of halogeno-phenol (parts) | Tg (°C.) | State during immersion in NMP |
|---|---|---|---|---|
| 30 | 40 | bis(3,5-dibromo-4-hydroxyphenyl)-sulfone (3.5) | 201 | Not dissolved |
| 31 | 100 | 3,5-dibromo-4-hydroxybenzo-nitrile (5) | 238 | Not dissolved |
| 32 | 100 | 3,5-dichloro-4-hydroxybenzo-nitrile (5) | 235 | Not dissolved |

EXAMPLES 33–35

A three-necked flask equipped with a Dean-Stark tube, a stirrer, a thermometer and a nitrogen introduction tube was charged with 2000 parts of dimethyl sulfoxide, 600 parts of toluene, 308 parts of 2,2-bis(4-hydroxyphenyl)propane (bisphenol A), 431 parts of 4,4'-dichlorodiphenylsulfone and 414 parts of anhydrous potassium carbonate. The mixture was heated to 150° C., and maintained at 145° to 155° C. for 5 hours. Water was continuously removed as an azeotrope with toluene.

Then, 200 parts of 2,2-bis(3,5-dibromo-4-hydroxyphenyl)propane and 102 parts of potassium carbonate were added, and the mixture was reacted at 145° to 155° C. for hours. The resulting viscous solution was cooled, and with stirring by a blender, a large amount of methanol was poured into it to precipitate the polymer. The precipitated polymer was thoroughly washed with water and methanol, and then dried.

The resulting polymer (oligomer) had an inherent viscosity of 0.24, and a Tg of 190° C.

In each run, 100 parts of the polymer was mixed with a predetermined amount of each of the cyclic iminoethers shown in Table 8, and the mixture was melt-extruded at 250° C. The composition had a flow initiation temperature of less than 150° C. Then, 100 parts of the composition was uniformly mixed with bis(3,5-dibromo-4-hydroxyphenyl)sulfone in each of the amounts indicated in Table 9. The mixture was melted at 160° C., and forced into a mold kept at 220° C., and maintained at this temperature for 10 minutes, and then cooled to obtain a molded article. The molded article was transparent and had the Tg indicated in Table 9.

TABLE 9

| Example | Cyclic imino ether (parts) | Amount of bis-(3,5-dibromo-4-hydroxyphenyl)-sulfone (parts) | Tg (°C.) of the molded article |
|---|---|---|---|
| 33 | 2,2'-m-phenyl-enebis(2-oxa-zoline) (70) | 7 | 252 |
| 34 | 2,2'-p-phenyl-enebis(2-oxa-zoline) (40) | 4 | 241 |
| 35 | 2,2'-m-phenyl-enebis(5,6-di-hydro-4H-1,3-oxazine) (100) | 5 | 225 |

EXAMPLE 36

Diphenylene isophthalate (318 parts) and 104 parts of hexamethylenediamine were charged into a reactor equipped with a stirrer, and heated to 250° C. in a stream of nitrogen. The reaction was carried out for 30 minutes while the phenol formed by the reaction was evaporated out of the reaction system.

Then, 40 parts of 4,4'-diaminodiphenylmethane was added, and reacted for 60 minutes. The resulting polymer had an inherent viscosity of 0.33 and a heat distortion temperature of 130° C.

Then, 70 parts of the polymer chips were mixed with 30 parts of m-phenylenebis(2-oxazoline), and the mixture was melt-extruded at 200° C. by using a twin-screw extruder. The resulting composition had a flow initiation temperature of 121° C.

One hundred parts of the composition was uniformly mixed with 3 parts of tetrabromophthalic acid, and the mixture was melted at 180° C., and extruded into a mold heated at 200° C. Fifteen minutes later, the mold was cooled to obtain a molded article. The resulting molded article was transparent, and had a Tg of 182° C., a flexural strength of 2280 kg/cm$^2$ and a flexural modulus of 35500 kg/cm$^2$. It did not dissolve in NMP.

EXAMPLES 37–40

The procedure of Examples 25 to 27 was repeated except that 156 parts of m-xylylenediamine was used instead of 122 parts of m-xylenediamine. The resulting polymer had an inherent viscosity of 0.15 and a heat distortion temperature of 152° C.

One hundred parts of the polymer was melt-mixed with 2,2'-m-phenylenebis(2-oxazoline) in each of the amounts indicated in Table 10 at 260° C. in a stream of nitrogen. The resulting mixture had a flow initiation temperature of less than 150° C.

One hundred parts of the composition was uniformly mixed at 150° C. with a predetermined amount of each of the halogenophthalic acid derivatives indicated in Table 10, and the mixture was charged into a mold kept at 200° C., and maintained for 5 minutes. The resulting molded article showed the properties given in Table 10.

TABLE 10

| Example | Amount of 2,2'-m-phenylenebis-(2-oxazoline) (parts) | Halogenophthalic acid derivative (parts) | Properties of the molded article Tg (°C.) | Solubility in NMP |
|---|---|---|---|---|
| 37 | 30 | tetrachlorophthalic acid (3) | 196 | insoluble |
| 38 | 40 | tetrabromophthalic N-phenylmonoamide (3) | 203 | " |
| 39 | 70 | tetrabromophthalic anhydride (5) | 227 | " |
| 40 | 100 | monoisopropyl tetrabromophthalate (10) | 239 | " |

EXAMPLE 41

216 Parts of 2,2'-m-phenylenebis(2-oxazoline), 139 parts of 4,4'-diaminodiphenylmethane and 28 parts of bis(3,5-dibromo-4-hydroxyphenyl)sulfone were put into a glass reactor and well mixed. After purging with nitrogen the mixture was heated to 130° to 140° C. to prepare a resin solution (a thermosetting resin-forming composition). Ten plies of plain-weave cloths of aramid fibers (Technora ®, made by Teijin Limited) were set in a mold (thickness 3 mm) heated at 160° C., and the resin solution was poured into the mold and cured under the same conditions for 3 minutes.

The resulting molded article had a fiber volume content of 54%, a flexural strength of 35.2 kg/mm$^2$, a flexural modulus of 1350 kg/mm$^2$, and a heat distortion temperature of more than 200° C. The impregnability of the resin solution was good, and no void was observed in the molded article.

When the molded article was reacted for 1 hour in acetone and toluene under reflux, it was not attacked, and showed excellent solvent resistance.

EXAMPLE 42

24.4 Parts of 2,2'-m-phenylenebis(5,6-dihydro-4H-1,3-oxazine), 27 parts of 2,2-bis(3,5-dibromo-4-hydroxyphenyl)propane, 2 parts of 4,4'-diaminodiphenylmethane and 1 part of ethyl p-toluenesulfonate were dissolved in 50 parts of methyl ethyl ketone to prepare a varnish. Carbon fiber woven fabrics (Toreca Cloth #6343, made by Toray Inc.) were immersed in the varnish, and then heat-treated at 60° C. for 1 hour to form prepregs.

Twenty plies of such prepregs were laminated, and cured at 200° C. under a pressure 10 kg/cm$^2$ for 30 minutes to obtain a molded plate.

The molded plate contained 60% by volume of the fibers and was very tough. It had a heat distortion temperature of more than 200° C., and showed the same solvent resistance as in Example 41.

EXAMPLE 43

A first liquid component composed of 100 parts of 2,2'-m-phenylenebis(2-oxazoline) and 58 parts of 4,4'-diphenylmethane diisocyanate and a second liquid component composed of 46 parts of polyethylene glycol having an average molecular weight of 400, 23 parts of 4,4'-diaminodiphenylmethane and 3 parts of benzenesulfonic acid were individually put into a glass vessels. After purging with nitrogen, they were heated individually to 130° C. to form uniform solutions. The two solutions were mixed in a glass reactor and stirred. Reaction immediately occurred, and 20 seconds later, the mixture attained a temperature of 248° C., and cured. The resulting resin was whitish brown and very tough, and had a heat distortion temperature of 155° C.

EXAMPLE 44

A vessel for dissolving and mixing equipped with a stirring device was charged with 21.6 parts of 2,2'-m-phenylenebis(2-oxazoline) and 13.9 parts of 4,4'-diaminodiphenylmethane, and after purging the vessel with nitrogen, the compounds were stirred at 120° C. for 30 minutes to form a transparent uniform solution. Seventy parts of precipitated calcium carbonate (average particle diameter about 2 micrometers) was added little by little to the solution over about 2 hours, and they were mixed to form a melt having calcium carbonate uniformly dispersed in it. With the addition of calcium carbonate, the viscosity of the melt gradually increased. The melt was cooled to 100° C., and then mixed uniformly with 2.8 parts of bis(3,5-dibromo-4- hydroxyphenyl)sulfone. The mixture was taken out from the mixing vessel, cooled to room temperature to solidify it, and crushed to form chips.

The chips were found to have a melt viscosity, measured at 100° C., of about 8,000 poises, and had good flowability.

EXAMPLE 45

The chips of the thermoset resin composition obtained in Example 44 were compression-molded in a die at 160° C. under 1 to 5 kg/cm² for 10 minutes to form a tough resin having a heat deformation temperature of 218° C., a flexural strength of 900 kg/cm² and a flexural modulus of 76,000 kg/cm². The resin was not at all attacked when immersed in acetone, methanol, xylene, trichloroethylene and dioxane, and showed excellent solvent resistance.

EXAMPLE 46

A vessel for dissolving and mixing equipped with a stirring device was charged with 21.6 parts of 2,2'-m-phenylenebis(2-oxazoline) and 11 parts of 1,4-cyclohexane dimethanol, and after purging the vessel with nitrogen, the compounds were stirred at 120° C. for 30 minutes to form a transparent uniform solution. To the solution was gradually added 52 parts of calcium carbonate (average particle diameter about 2 micrometers). The materials were dispersed and mixed. The temperature was then adjusted to 100° C. and 0.6 part of ethyl p-toluenesulfonate was added and uniformly mixed. The mixture ws taken out from the mixing vessel, solidified by cooling, and crushed to form chips. The resulting composition had good flowability at 100° C., and a viscosity of about 7,000 poises.

When the thermocurable composition was compression-molded at 160° C. under 1 to 3 kg/cm² for 15 minutes, a tough resin was obtained. The resin had a heat distortion temperature of 182° C. It was not attacked at all when immersed in acetone, dioxane and trichloroethylene, and showed excellent solvent resistance.

EXAMPLE 47

A transparent homogeneous composition was obtained by dissolving 70 parts of a polycarbonate (intrinsic viscosity 0.74) obtained by ester interchange reaction of bisphenol A and diphenyl carbonate, 20 parts of 2,2-bis(3,5-dibromo-4-hydroxyphenyl)propane, 30 parts of 2,2'-m-phenylenebis(2-oxazoline) and 5 parts of ethyl p-toluenesulfonate in 500 parts of methylene chloride at room temperature.

Then the composition was cast on a smooth iron plate and left to stand for 1 hour at room temperature in an air stream. It was then compression-molded at 200° C. for 5 minutes into a sheet. The sheet obtained had a cross-linking degree (weight % of refluxing dioxane-undissolved portions) of 51%, a heat distortion temperature of 265° C. and a flexural strength of 5.7 kg/mm² and was not melted even at 300° C.

For comparison, a sheet was obtained in the same way from the polycarbonate alone and its physical properties were measured. The sheet had a cross-linking degree of 0%, a distortion temperature of 150° C. and a flexural strength of 7.7 kg/mm².

EXAMPLE 48

Photochromism

The yellow transparent resin obtained in Example 8 was irradiated with light from a 100W uiltraviolet lamp (UM-102, made by Ushio Electrical Co., Ltd.) placed about 20 cm away from the resin at a temperature of about 15° C. for 30 seconds. The resin changed to a brilliant green transparent resin. When the green resin was immersed in an oil bath at 200° C. for 30 seconds, it again became yellow and transparent.

What we claim is:

1. A process for producing a thermoset resin, which comprises reacting
   (A) an organic compound containing at least two groups selected from the class consisting of alcoholic hydroxyl groups, aromatic amino groups and aromatic aminomethyl groups, said organic compound being a monomer, an oligomer or a polymer, and
   (B) a poly(cyclic iminoether) represented by the following formula (I)

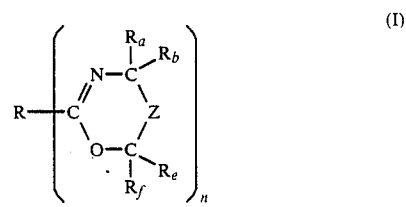

wherein n is an integer of 2 to 4, R represents a hydrocarbon group having a valence of n which may be interrupted or substituted by an atom other than carbon or a group containing an atom other than carbon, Z represents a direct bond or a group of the formula

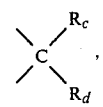

$R_a$, $R_b$, $R_c$, $R_d$, $R_e$ and $R_f$ are identical or different, and each represents a hydrogen atom, methyl, ethyl, propyl, phenyl, tolyl or benzyl with the proviso that when n is 2, R may also represent a direct bond, with the proviso that when said organic compound (A) is a monomeric compound having at least two aromatic amino groups said poly(cyclic iminoether) is the compound represented by the formula (I) wherein Z represents the group of the formula

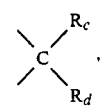

in the presence of
   (C) a compound acting as an acid catalyst, at an elevated temperature.

2. The process of claim 1 wherein the organic compound (A) is monomeric aliphatic or alicyclic polyhydroxy compound having at least two alcoholic hydroxyl groups.

3. The process of claim 2 wherein the polyhydroxyl compound has a pKa of at least 9.0.

4. The process of claim 2 wherein the polyhydroxy compound is selected from the group consisting of ethylene glycol, propylene glycol, trimethylene glycol, butanediol, hexanediol, octanediol, decamethylenediol, diethylene glycol, triethylene glycol, glycerol, trimethylol propane, pentaerythritol, neopentyl glycol, cyclohexanedimethanol, dihydroxycyclohexane and trihydroxycyclohexane.

5. The process of claim 1 wherein the organic compound (A) is an oligomer or polymer having at least two aliphatic or alicyclic, alcoholic hydroxyl groups.

6. The process of claim 5 wherein the oligomer or polymer as the organic compound (A) is substantially linear and has a flow initiation temperature of not more than 300° C.

7. The process of claim 1 wherein the oligomer or polymer as the organic compound (A) is selected from the group consisting of polyamides, polyethers, polysulfones, polyurethanes, polyesters, polyetherimides, polyetherketones, polysulfides, polyethylene, polystyrene and polybutadiene.

8. The process of claim 1 wherein the organic compound (A) is a monomeric aromatic polyamine having at least two aromatic amino groups.

9. The process of claim 8 wherein the aromatic amino groups of the aromatic polyamine are primary or secondary.

10. The process of claim 8 wherein the aromatic polyamine as the organic compound (A) is selected from the group consisting of 4,4'-diaminodiphenylmethane, 3,3'-diaminodiphenylsulfone, 4,4'-diaminodiphenylether, 3,4'-diaminodiphenylether, 4,4'-diaminobenzophenone, 3,3'-diaminobenzophenone, o-phenylenediamine, m-phenylenediamine, diaminonaphthalene, 4,4'-diaminodiphenylsulfide, 2,4-diaminotoluene, 2,6-diaminotoluene, 1,2-dianilinoethane, 4,4'-diaminobiphenyl and 2,2-bis[4-(4-aminophenoxy)phenyl]propane.

11. The process of claim 1 wherein the organic compound (A) is a monomeric aromatic polyamine having at least two aromatic aminomethyl groups.

12. The process of claim 11 wherein the aromatic aminomethyl groups of the aromatic polyamine are primary or secondary.

13. The process of claim 11 wherein the aromatic polyamine as the organic compound (A) is selected from the group consisting of p-xylylenediamine, m-xylylenediamine and a mixture of these.

14. The process of claim 1 wherein the organic compound (A) is a monomeric aromatic polyamine having an aromatic amino group and an aromatic aminomethyl group.

15. The process of claim 1 wherein the organic compound A is a polymer or oligomer having at least two groups selected from aromatic amino and aromatic aminomethyl groups as terminal groups.

16. The process of claim 15 wherein the polymer or oligomer as the organic compound (A) is substantially linear and has a melting point of not more than 300° C.

17. The process of claim 15 wherein the polymer or oligomer as the organic compound (A) is selected from the group consisting of polyamides, polyethers, polysulfones, polyurethanes, polyesters, polyetherimides, polyetherketones, polyphenylenesulfides, polyethylene, polyazomethine and polyamideimides.

18. The process of claim 1 wherein the organic compound (A) has an alcoholic hydroxyl group and a group selected from aromatic amino and aromatic aminomethyl groups.

19. The process of claim 1 wherein the poly(cyclic iminoether) (B) is an oxazoline represented by the following formula (I-1)

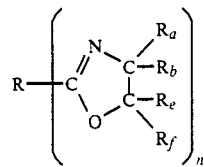

wherein R, $R_a$, $R_b$, $R_e$, $R_f$ and n are as defined with regard to formula (I).

20. The process of claim 19 wherein n in formula (I-1) is 2.

21. The process of claim 19 wherein the n-valent hydrocarbon group for R in formula (I-1) is an aliphatic hydrocarbon group having 1 to 10 carbon atoms, an alicyclic hydrocarbon group having 5 to 10 carbon atoms, or an aromatic hydrocarbon group having 6 to 12 carbon atoms.

22. The process of claim 1 wherein the poly(cyclic iminoether) (B) is an oxazine represented by the following formula (I-2)

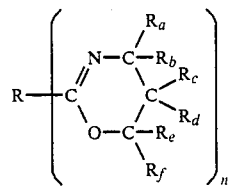

wherein R, $R_a$, $R_b$, $R_c$, $R_d$, $R_e$, $R_f$ and n are as defined with regard to (I).

23. The process of claim 22 wherein n in formula (I-2) is 2.

24. The process of claim 22 wherein the n-valent hydrocarbon group for R in formula (I-2) is an aliphatic hydrocarbon group having 1 to 10 carbon atoms, an alicyclic hydrocarbon group having 5 to 10 carbon atoms, or an aromatic hydrocarbon group having 6 to 12 carbon atoms.

25. The process of claim 1 wherein the poly(cyclic iminoether) (B) is a mixture of the oxazoline of formula (I-1) and the oxazine of formula (I-2).

26. The process of claim 1 wherein the compound (C) acting as an acid catalyst is selected from the group consisting of (1) protonic acids having a pKa of not more than 2.5, (2) esters of protonic acids having a pKa of not more than 1.0, (3) salts of protonic acids having a pKa of not more than 2.5, (4) Lewis acids and complexes thereof, (5) alkyl halides, and (6) iodine 27. A process for producing a thermoset resin, which comprises reacting (A) an organic compound containing at least two groups selected from the class consisting of alcoholic hydroxyl groups, aromatic amino groups and aromatic aminomethyl groups, and (B) a poly(cyclic iminoether) represented by the following formula (I)

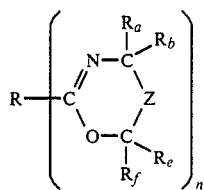

(I)

wherein n is an integer of 2 to 4, R represents a hydrocarbon group having a valence of n which may be interrupted or substituted by an atom other than carbon or a group containing an atom other than carbon, Z represents a direct bond or a group of the formula

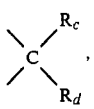

$R_a$, $R_b$, $R_c$, $R_d$, $R_e$ and $R_f$ are identical or different, and each represents a hydrogen atom, methyl, ethyl, propyl, phenyl, tolyl or benzyl with the proviso that when n is 2, R may also represent a direct bond, in the presence of (C) a compound acting as an acid catalyst, at an elevated temperature, said compound acting as an acid catalyst being a halogenophenol represented by the following formula (III)

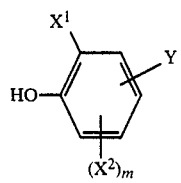

(III)

wherein $X_1$ and $X_2$ are identical or different, and each represents a halogen atom, m is 0, 1 or 2, Y is $-SO_2R_1$, $-COR_2$, $-CN$ or $-NO_2$, $R_1$ represents an alkyl group having 1 to 20 carbon atoms which may be substituted, an aryl group having 6 to 12 carbon atoms or $-NR_3R_4$, $R_2$ represents an alkyl group having 1 to 20 carbon atoms which may be substituted, a cycloalkyl group having 5 to 10 carbon atoms, an aryl group having 6 to 12 carbon atoms, $-OR_5$ or $-NR_6R_7$, and $R_3$, $R_4$, $R_5$, $R_6$ and $R_7$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms.

28. The process of claim 27 wherein the halogenophenol of formula (III) has a 4-hydroxy-3,5-dichlorophenyl or 4-hydroxy-3,5-dibromophenyl skeleton.

29. A process for producing a thermoset resin, which comprises reacting (A) an organic compound containing at least two groups selected from the class consisting of alcoholic hydroxyl groups, aromatic amino groups and aromatic aminomethyl groups, and (B) a poly(cyclic iminoether) represented by the following formula (I)

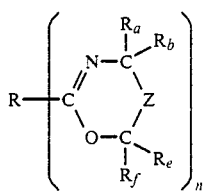

(I)

wherein n is an integer of 2 to 4, R represents a hydrocarbon group having a valence of n which may be interrupted or substituted by an atom other than carbon or a group containing an atom other than carbon, Z represents a direct bond or a group of the formula

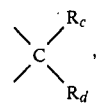

$R_a$, $R_b$, $R_c$, $R_d$, $R_e$ and $R_f$ are identical or different, and each represents a hydrogen atom, methyl, ethyl, propyl, phenyl, tolyl or benzyl with the proviso that when n is 2, R may also represent a direct bond, in the presence of (C) a compound acting as an acid catalyst, at an elevated temperature, said compound acting as an acid catalyst being a halogenophthalic acid represented by the following formula (IV)

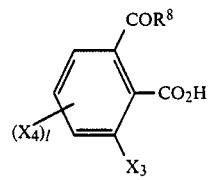

(IV)

wherein $X_3$ and $X_4$ are identical or different and each represents a halogen atom, l is a number of 0, 1, 2 or 3, and $R_8$ represents an alkyl group having 1 to 20 arbon atoms which may be substituted, a cycloalkyl group having 5 to 10 carbon atoms, an aryl group having 6 to 12 carbon atoms, $-OR_5$ or $-NR_6R_7$, and $R_5$, $R_6$ and $R_7$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms, and/or a halogenophthalic anhydride represented by the following formula (V)

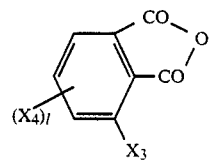

(V)

wherein $X_3$, $X_4$ and l are as defined above.

30. The process of claim 29 wherein the halogenophthalic acid of formula (IV) is a tetrachlorophthalic acid or a tetrabromophthalic acid, and the halogenophthalic anhydride of formula (V) is a tetrachlorophthalic anhydride or a tetrabromophthalic anhydride.

31. The process of claim 1 wherein the organic compound (A) is used in such a proportion that the total equivalent number of the alcoholic hydroxyl groups, aromatic amino groups and aromatic aminomethyl groups of the organic comppound (A) is 0.1 to 1.2 per equivalent of the cyclic imionoether groups of the poly(cyclic iminoether).

32. The process of claim 31 wherein said total equivalent number of the organic compound (A) is 0.2 to 1.0.

33. The process of claim 1 wherein the compound (C) is used in an amount of 0.01 to 20 mole % based on the poly(cyclic iminoether) (B).

34. The process of claim 1 wherein the reaction is carried out at a temperature between 60° and 340° C.

35. A process for producing a thermoset resin, which comprises reacting
(A') an organic compound containing at least two phenolic hydroxyl groups, or at least one phenolic hydroxyl group and at least one group selected from alcoholic hydroxyl groups, aromatic amino groups and aromatic aminomethyl groups, the phenolic hydroxyl groups being partly or wholly the 1-hydroxy group of a 1-hydroxydihalophenyl group free from an electron attracting atom or group other than halogen atoms, and
(B) the poly(cyclic iminoether) represented by formula (I),
in the presence of
(C) a compound acting as an acid catalyst, at an elevated temperature.

36. The process of claim 35 wherein the organic compound (A') is represented by the following formula (II)

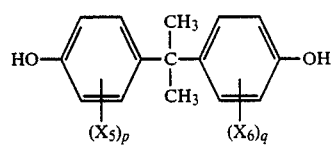

(II)

wherein $X_5$ and $X_6$ are identical or different and each represents chlorine or bromine, and p and q are identical or different and each is 1 or 2.

37. A thermocurable composition for production of thermoset resins, said composition comprising
(A) an organic compound containing at least two groups selected from the class consisting of alcoholic hydroxyl groups, aromatic amino groups and aromatic aminomethyl groups, said organic compound being a monomer, an oligomer or a polymer,
(B) a poly(cyclic iminoether) represented by the following formula (I)

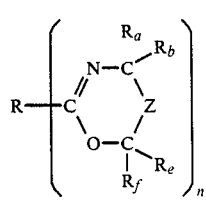

(I)

wherein n is an integer of 2 to 4, R represents a hydrocarbon group having a valence of n which may be interrupted or substituted by an atom other than carbon or a group containing an atom other than carbon, Z represents a direct bond or a group of the formula

$R_a$, $R_b$, $R_c$, $R_d$, $R_e$ and $R_f$ are identical or different, and each represents a hydrogen atom, methyl, ethyl, propyl, phenyl, tolyl or benzyl with the proviso that when n is 2, R may also represent a direct bond, and
(C) a compound acting as an acid catalyst,
with the proviso that when said organic compound (A) is a monomeric compound having at least two aromatic amino groups said poly(cyclic iminoether) is the compound represented by the formula (I) wherein Z represents the group of the formula

38. A thermocurable composition for production of thermoset resins, said composition comprises
(A) an organic compound containing at least two groups selected from the class consisting of alcoholic hydroxyl groups, aromatic amino groups and aromatic aminomethyl groups,
(B) a poly(cyclic iminoether) represented by the following formula (I)

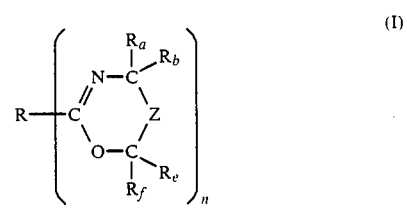

(I)

wherein n is an integer of 2 to 4, R represents a hydrocarbon group having a valence of n which may be interrupted or substituted by an atom other than carbon or a group containing an atom other than carbon, Z represents a direct bond or a group of the formula

$R_a$, $R_b$, $R_c$, $R_d$, $R_e$ and $R_f$ are identical or different, and each represents a hydrogen atom, methyl, ethyl, propyl, phenyl, tolyl or benzyl with the proviso that when n is 2, R may also represent a direct bond, and
(C) a compound acting as an acid catalyst, said compound acting as an acid catalyst being selected from the group consisting of a halogenophenol represented by the following formula (III)

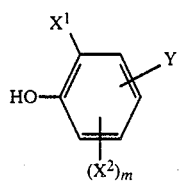
(III)

wherein $X^1$, and $X^2$ are identical or different, and each represents a halogen atom, m is 0, 1 or 2, Y is $-SO_2R_1$, $-COR_2$, $-CN$ or $-NO_2$, $R_1$ represents an alkyl group having 1 to 20 carbon atoms which may be substituted, an aryl group having 6 to 12 carbon atoms or $-NR_3R_4$, $R_2$ represents an alkyl group having 1 to 20 carbon atoms which may be substituted, a cycloalkyl group having 5 to 10 carbon atoms, an aryl group having 6 to 12 carbon atoms, $-OR$ or $-NR_6R_7$, and $R_3$, $R_4$, $R_5$, $R_6$ and $R_7$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms, a halogenophthalic acid represented by the following formula (IV)

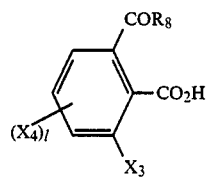
(IV)

wherein $X_3$ and $X_4$ are identical or different and each represents a halogen atom, l is a number of 0, 1, 2 or 3, and $R_8$ represents an alkyl group having 1 to 20 arbon atoms which may be substituted, a cycloalkyl group having 5 to 10 carbon atoms, an aryl group having 6 to 12 carbon atoms, $-OR_5$ or $-NR_6R_7$, and $R_5$, $R_6$ and $R_7$ are identical or different and each represents a hydrogen atom, an alkyl group having 1 to 20 carbon atoms which may be substituted, a cycloalkyl group having 5 to 10 carbon atoms, or an aryl group having 6 to 12 carbon atoms, and a halogenophthalic anhydride represented by the following formula (V)

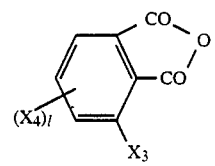
(V)

wherein $X_3$, $X_4$ and l are as defined above.

39. A thermocurable composition for production of thermoset resins, said composition comprises
(A') an organic compound containing at least two phenolic hydroxyl groups, or at least one phenolic hydroxyl group and at least one group selected from alcoholic hydroxyl groups, aromatic amino groups and aromatic aminomethyl groups, the phenolic hydroxyl groups being partly or wholly the 1-hydroxy group of a 1-hydroxydihalophenyl group free from an electron attracting atom or group other than halogen atoms,
(B) the poly(cyclic iminoether) represented by formula (I), and
(C) a compound acting as an acid catalyst.

40. A thermoset resin obtained by the process of any one of claims 1, 27, 29 and 35.

41. A composite thermoset resin material produced by performing the thermal reaction of any one of claims 1, 27, 29 and 35 in the presence of fillers, reinforcing fibers or a thermoplastic resin.

* * * * *

UNITED STATES PATENT AND TRADEMARK OFFICE
CERTIFICATE OF CORRECTION

PATENT NO. : 4,931,512
DATED : June 5, 1990
INVENTOR(S) : SHUNICHI MATSUMURA ET AL.

It is certified that error appears in the above-identified patent and that said Letters Patent is hereby corrected as shown below:

On the cover page, under the "Assignee", the following should be inserted:

--[*] Notice: The portion of the term of this patent subsequent to March 20, 2007 has been disclaimed--.

Column 30, line 49:
Claim 25, line 2, "mixure" should read --mixture--.

Column 32, line 48:
Claim 29, line 43, "arbon" should read --carbon--.

Column 33, line 10:
Claim 31, line 5 "comppound", should read --compound--:

Column 33, line 11:
Claim 31, line 6 "imionoether" should read --iminoether--.

Column 33, lines 60-68:
Claim 37, delete the first formula and insert therefor:

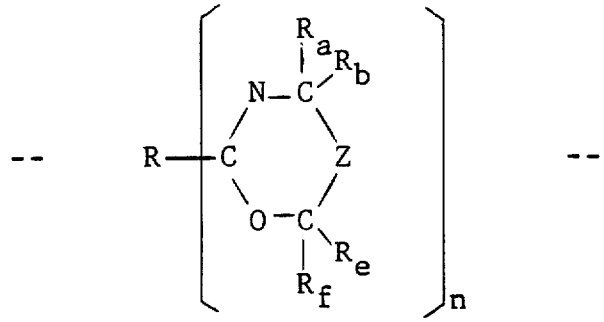

UNITED STATES PATENT AND TRADEMARK OFFICE
CERTIFICATE OF CORRECTION

PATENT NO. : 4,931,512

DATED : June 5, 1990

INVENTOR(S) : SHUNICHI MATSUMRA ET AL.

It is certified that error appears in the above-identified patent and that said Letters Patent is hereby corrected as shown below:

Column 35, line 41:
Claim 38, line 62 "arbon" should read --carbon--.

Signed and Sealed this

Fifteenth Day of October, 1991

Attest:

HARRY F. MANBECK, JR.

*Attesting Officer*     *Commissioner of Patents and Trademarks*